US007624111B2

(12) United States Patent
Reddish et al.

(10) Patent No.: US 7,624,111 B2
(45) Date of Patent: Nov. 24, 2009

(54) ACTIVE CONTENT TRUST MODEL

(75) Inventors: Andrew Douglas Reddish, Seattle, WA (US); Dale Elton Rogerson, Seattle, WA (US); Justin Shane McRoberts, Seattle, WA (US); Praful Pratap Chavda, Redmond, WA (US); Sridhar Chandrashekar, Redmond, WA (US); Wenlong Dong, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 161 days.

(21) Appl. No.: 11/167,448

(22) Filed: Jun. 27, 2005

(65) Prior Publication Data

US 2006/0294102 A1     Dec. 28, 2006

(51) Int. Cl.
*G06F 700/2006* (2006.01)
(52) U.S. Cl. .................................. 707/9; 714/25; 726/25
(58) Field of Classification Search ........................ None
See application file for complete search history.

(56) References Cited

U.S. PATENT DOCUMENTS 6,145,096 A * 11/2000 Bereiter et al. ................. 714/25
6,272,641 B1 * 8/2001 Ji ................................. 726/24
2002/0152173 A1 * 10/2002 Rudd ............................ 705/57
2004/0122926 A1 * 6/2004 Moore et al. ................. 709/223

OTHER PUBLICATIONS

Brady, Owen; Steven Clay; Hilary Ganley; Mansour Al-Meaither; Lazaros Haleplidis; Matthew Joyce; Samuel Yee; "Active Content Security", Jul. 2003, Oregon State University.*
International Search Report and Written Opinion dated Feb. 26, 2008 from International application No. PCT/US06/17583.

* cited by examiner

*Primary Examiner*—Charles Rones
*Assistant Examiner*—Dinku W Gebresenbet
(74) *Attorney, Agent, or Firm*—John D. Veldhuis-Kroeze; Westman, Champlin & Kelly, P.A.

(57) ABSTRACT

An active content trust model provides security in a help system. The security is provided in response to a call from a calling application to access active content. When the call is received, a determination is made, based on predetermined criteria, which execution mode to use to access the active content. The active content is then accessed in the determined execution mode, thus providing the security.

11 Claims, 6 Drawing Sheets

FIG. 6

ACTIVE CONTENT TRUST MODEL

BACKGROUND

The discussion below is merely provided for general background information and is not intended to be used as an aid in determining the scope of the claimed subject matter.

In computing environments, it is typical to have help systems to teach a user how to accomplish certain tasks. The help systems can be at the application or application suite (a group of bundled and related applications) level, or at the operating system (or shell) level. Typically, both levels of help systems are used, with many, if not most, applications having a built in help system.

Help content has traditionally been static in nature, providing the user with written or graphically illustrated instructions on how to complete a particular task. However, more recently, help content has begun moving from static text to being more of a dynamic experience. In the transition from static help content to dynamic or active help content, what was traditionally viewed as harmless text is becoming increasingly capable of executing code or causing code to be executed on behalf of the user. To aid users by allowing help content to take actions on their behalf, for purposes of efficiently executing the actions and/or teaching the user how to execute the actions by watching the actions being executed by the help system, help type files are increasingly containing active content-executable code or script. The active content files can be authored in such a way that these files themselves call other executable code which is then also executed. Two examples of active help content include Active Content Wizards (ACW's) and Shortcuts.

ACW's generally include code, in one form or another, to interact with the user interface, to essentially play a help topic for a user directly to the user interface. While an ACW is interacting with the user interface, the ACW will also typically provide a description to the user regarding the interaction. During playback, the ACW may allow the user to interact with the user interface to enter specific information, such as a filename, etc., to aid in the user's learning process. Shortcuts are help type files which automatically execute an operation. Generally, any operation or activity which can be executed from the shell execute command (e.g., the Start/Run command of a Windows® operating system) can be executed automatically using a shortcut.

The fact that help content can now contain or call up executable code (active content) creates the possibility for the user's computer and data to be intentionally or unintentionally harmed by such active content. With active help content also being available over, and sometimes automatically accessed from, web pages and other remote sources, even more opportunity for active help content to harm the user's computer and data exists.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A trust model for active content allows an end user to download and/or install and execute help content in a safe and secure manner. It protects the user's data and system by enforcing that only content that has been trusted by the user and/or administrator is allowed to call out to code or is allowed to use third party extensions. In some embodiments, the basis for these decisions falls on the calling application and the content set being displayed, as well as on the particular user running the application and the policy that is set for the particular computer and/or user. If one of these fails to have the necessary permissions or trust for execution, then the help system defaults into safe-mode where content becomes static and unable to harm the system.

DETAILED DESCRIPTION

Help content is moving from static text to being more a dynamic experience. To provide this dynamic experience, help content must sometimes be capable of executing code or causing code to be executed on behalf of the user. The disclosed embodiments provide trust model based security to protect the end user and to allow only trusted content to cause execution of code and perform actions on the user's behalf.

Figure 1:
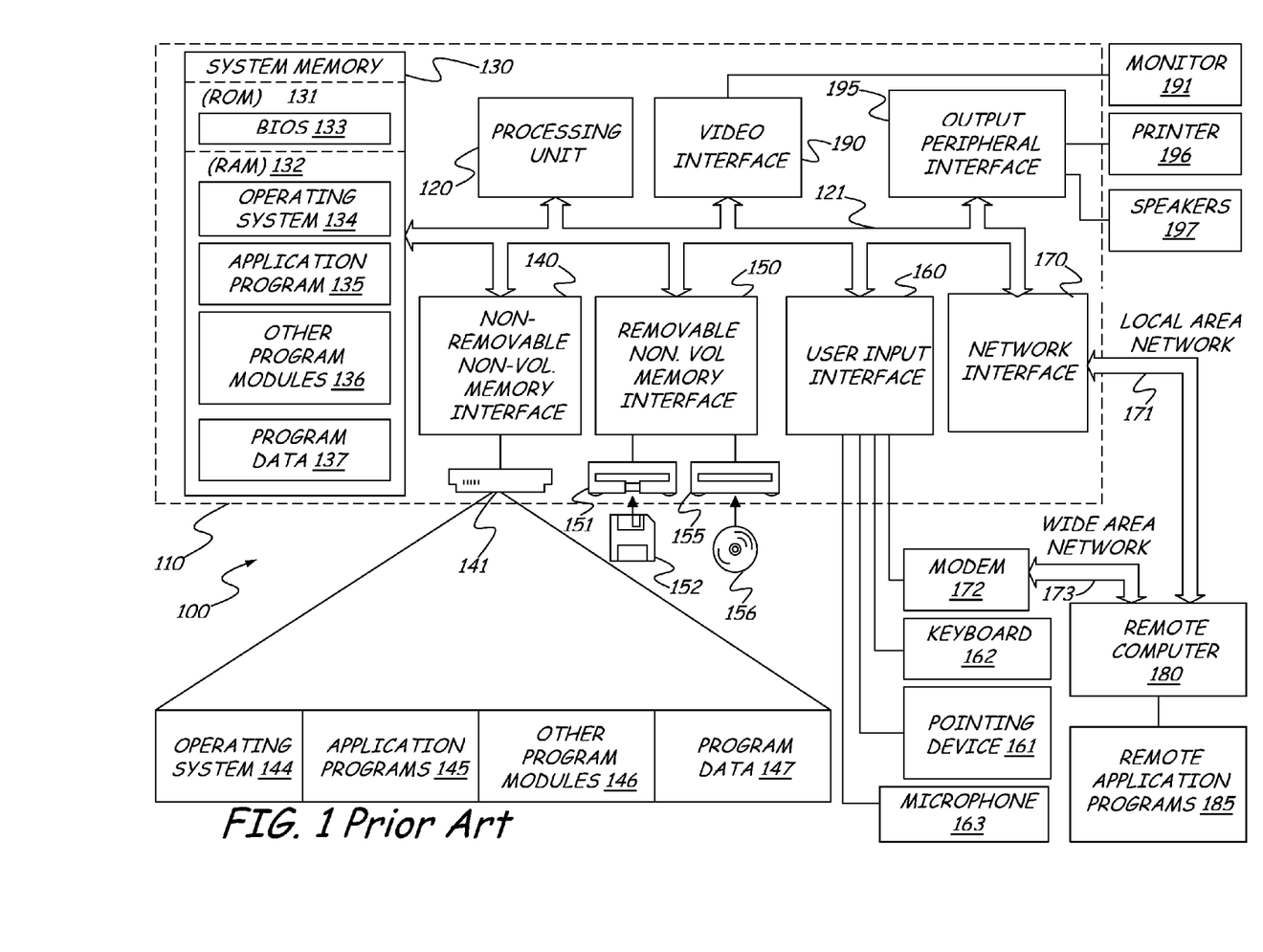
FIG. 1 is a block diagram of a general computing environment in which disclosed concepts can be practiced.

Help systems in general, and in particular the trust model based security help system embodiments described below, frequently work in the environment of a networked personal computer (PC), with the network being the internet, and/or a local network. The computing environment described generally below with reference to FIG. 1 is one example of a computing environment in which the disclosed embodiments can be implemented. Before describing further aspects of the illustrated embodiments, however, it may be useful to describe the example suitable computing environment shown in FIG. 1.

FIG. 1 illustrates an example of a suitable computing system environment 100 on which one or more aspects of the illustrated embodiments may be implemented. The computing system environment 100 is only one example of a suitable computing environment and is not intended to suggest any limitation as to the scope of use or functionality of the illustrated embodiments. Neither should the computing environment 100 be interpreted as having any dependency or requirement relating to any one or combination of components illustrated in the exemplary operating environment 100.

The illustrated embodiments are operational with numerous other general purpose or special purpose computing system environments or configurations. Examples of well-known computing systems, environments, and/or configurations that may be suitable for use with the illustrated embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The illustrated embodiments may be described in the general context of computer-executable instructions, such as program modules, being executed by a computer. Generally, program modules include routines, programs, objects, components, data structures, etc. that perform particular tasks or implement particular abstract data types. The illustrated embodiments may also be practiced in distributed computing environments where tasks are performed by remote processing devices that are linked through a communication network. In a distributed computing environment, program modules may be located in both local and remote computer storage media including memory storage devices. Tasks performed by the programs and modules are described below and with the aid of figures. Those skilled in the art can implement the description and figures provided herein as processor executable instructions, which can be written on any form of a computer readable medium.

With reference to FIG. 1, an exemplary system includes a general-purpose computing device in the form of a computer 110. Components of computer 110 may include, but are not limited to, a processing unit 120, a system memory 130, and a system bus 121 that couples various system components including the system memory to the processing unit. System bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, Intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
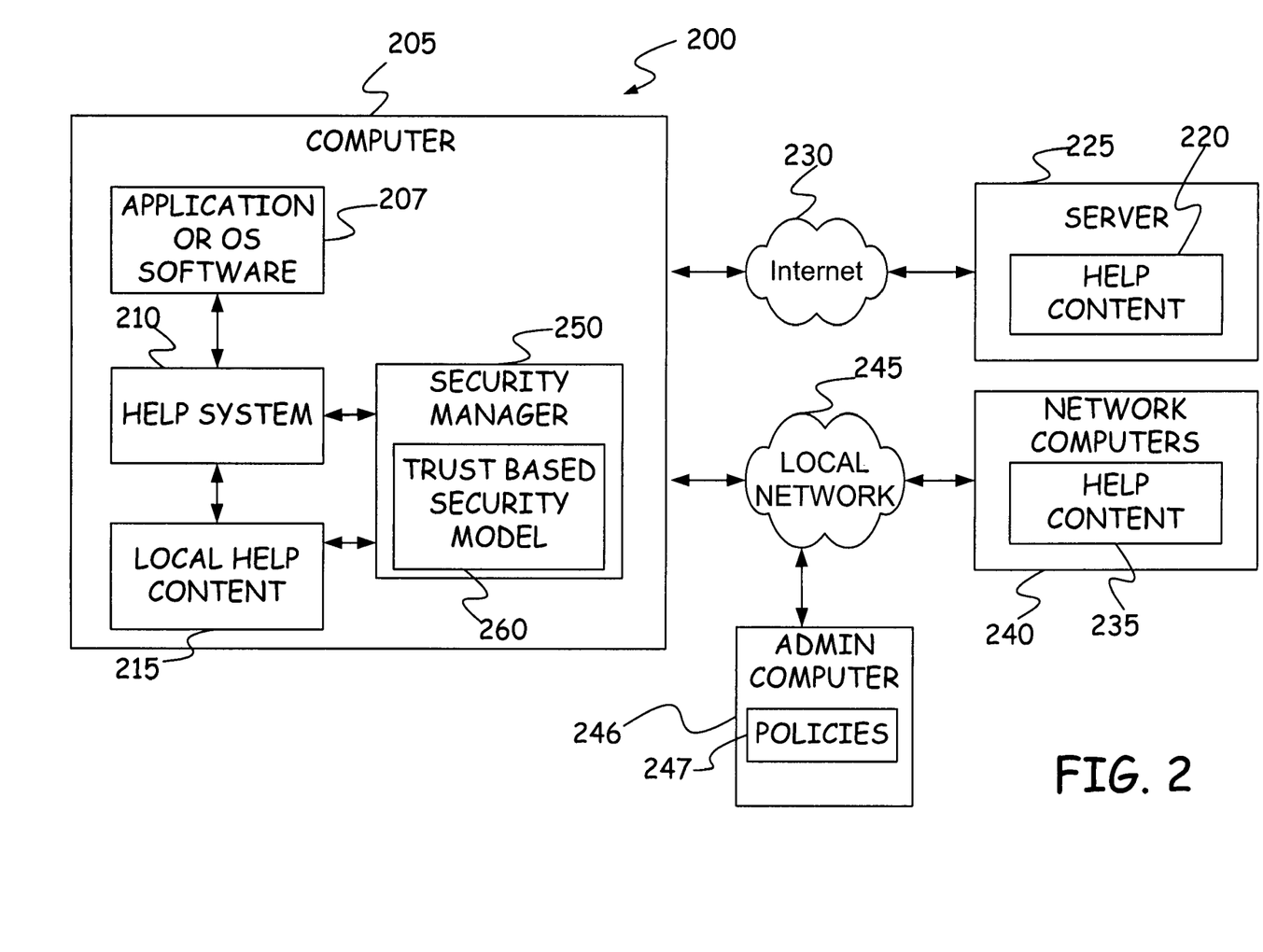
FIG. 2 is a block diagram of a trust based security model implementation in a computing environment.

Referring now to FIG. 2, shown more generally is a computer system or computing environment 200 in which a help system and a trust based security model are implemented or embodied. Shown in FIG. 2 is computer 205, which can be any of a variety of computing environments, including a PC, a laptop computer, a notebook computer, or other mobile or non-mobile computers. However, computer 205 is not limited to any particular type of computing environment.

Computer 205 hosts, runs, or otherwise supports application or operating system (OS) software 207 (hereafter referred to as "application 207" or "calling application 207") and a help system 210. When needed, application 207 calls help system 210 to access local help content 215 (the term "local" indicating its location on computer 205). Local help content 215 (as well as remote help content 220 and/or 235) will typically now include an increasing amount of active content. The phrase "active content" refers to content which is capable of executing code or causing code to be executed. Examples of active content include, for example, ACW's and Shortcuts, as described above.

In some embodiments, calling application 207 can also call or request help system 210 to access active help content 220 from a server computer 225 connected to computer 205 via the Internet 230 or other global or non-local computer network. Likewise, calling application 207 can call help system 210 to access active help content 235 from a computer 240 connected to the same local network (for example within an organization, etc.) 245.

Computer 205 is also configured to embody a security manager 250 which manages access of applications 207 to active help content, both local active content 215 and remote active content 220 and 235. Security manager 250 uses a trust based security model 260, which can be considered a set of rules for determining which applications or users can access active content, and which active content can be accessed. Security manager 250 also activates and controls two execution modes for help files or other files having active content, though additional or different modes can also be used. The execution modes are referred to here, for example purposes only, as the trust mode and the safe mode. These execution modes are described below in greater detail. In addition to controlling these execution modes using the criteria defined in or required by model 260, security manager 250 controls these security modes based also on administrative policies 247. For illustrative purposes, these policies are represented as being provided from an administrator's computer 246 connected to computer 205 via network 245. The policies 247 can override other criteria in determining which mode of execution is required for a particular user, for a particular computer, for a particular calling application or for particular active content.

As described, help topics can invoke code such as behaviors, ACWs, and Shortcuts. If a help system 210 is extensible, e.g., using behaviors and tiles (tiles are plug-ins to the help system that offer some service such as rendering, etc.), custom code can be invoked as well. For example, a behavior might reveal the state of the machine (the user is on a domain or not), or it might be interactive (an expanding menu with '+' and '−'). While the behaviors make the topics "active", they also introduce a level of risk on a user's machine. Specifically, behaviors are code that the user has already installed. The trust model 260 implemented by security manager 250 serves the purpose of securing content. Specifically, "untrusted" content could cause otherwise secure code to run on otherwise secure machines—and the results could be disastrous for the user.

When a user requests a help topic, the help system 210 must decide whether to permit or deny access to that topic, and then transitively to potentially dangerous code (behaviors, Active Content Wizards, etc.). Security manager 250 and its trust based security model 260 provide that control. Fundamentally, the help system must decide whether to trust that topic—at that point in time. As described below in greater detail, the trust based security model 260 specifies how to determine trust at any given moment for any given topic. The trust model 260 secures a user's computer from malicious attacks that happen as a result of running something which is untrusted or which wasn't explicitly trusted. Trusted malicious code can still result in negative consequences, but untrusted code is prevented from running. Some "attacks" might be beneficent help that happens to invoke an unintentionally destructive behavior. In exemplary embodiments, the trust model 260 secures against this as well. In general, but not provided as an exhaustive list, the trust based security model implemented by security manager 250 secures areas such as:

The general integrity of the entire help system (in scenarios of using help)—The help system protects the user from unexpected modifications to the system, such as changing files on disk or entries in the registry. Similarly, using help should never affect system reliability.

The user's privacy—The help system should never assist in unexpectedly passing data across applications or the internet.

The integrity of currently installed help—While this might fall under the category of "general integrity" above, it is worth noting specifically that using help, or installing new help, should never break help that worked previously.

The trust model also prohibits a user who does not have enough privileges from executing active content. The trust model also upholds the policy set by the system administrator and protects the integrity of the help system (in help scenarios) against both malicious code as well as from a user with limited privileges from executing active content.

Security manager 250 and its trust model 260 allow an end user to download and/or install help content in a safe and secure manner. It manages access to active content in a manner such that only content that has been trusted by the user is allowed to call out to code or is allowed to use third party extensions. Another benefit is the ability for corporations, original equipment manufacturers (OEMs), or anyone who distributes content to keep their help corpus (content sets) protected from spamming and spoofing from malicious attacks. As described below, one of the requirements for secure content is to require that content to be digitally signed.

Also by requiring content to be digitally signed by the distributor, there is a trail to follow to malicious content and the ability to verify data integrity.

Security manager 250 enforces two major rules: never allow the help to cause an elevation of privilege and never allow content to cause execution if the user has not explicitly or implicitly trusted that content, or if the policy of the machine does not allow it. For example, if a domain administrator at a company turns off all access to the web from work stations, even if the user trusts content, the security manager will not allow the code to execute. Applications that request help have their privileges checked and the same credentials/privileges are used whenever accessing any resources or executing code. This prevents an exploitation of the help system to be used by lesser privileged apps to execute code in a more privileged context. If the privileges are sufficiently low, or policy dictates, then potentially dangerous content is disabled.

An end user can explicitly trust help by installing the application, its help, and trusting the certificate that the help content is signed with. Furthermore implicit trust is granted by installing help content that is signed with a certificate already installed in the trusted certificate store. With out this trust, the help will function as static text and will not call out to third party code or allow any of the potentially unsafe active features of the help system to be utilized. Help content as a set of information can be protected by being signed since only content with the same certificate can exist as a child of that content set. However, in some embodiments, even if content from a particular certificate was trusted earlier, the system can require explicit permission from the user to accept any new content, particularly for a different application or for another content set. In other words, even if a user accepts content for an application with a certificate from a particular company or content provider, that does not mean that the user automatically accepts content from another product of that same company. Another feature of exemplary embodiments uses the concept of a coupon file, or key, that will allow a set or subset of content to plug into another content set. This key is controlled by the original owner of the parent content set and handed out to designated organizations Digital signatures are used to validate and allow online content to participate in the trust model. Thus help content coming from a server or a storage device can be safely checked to determine if it can cause code execution or make use of advanced active behaviors.

Figure 3:
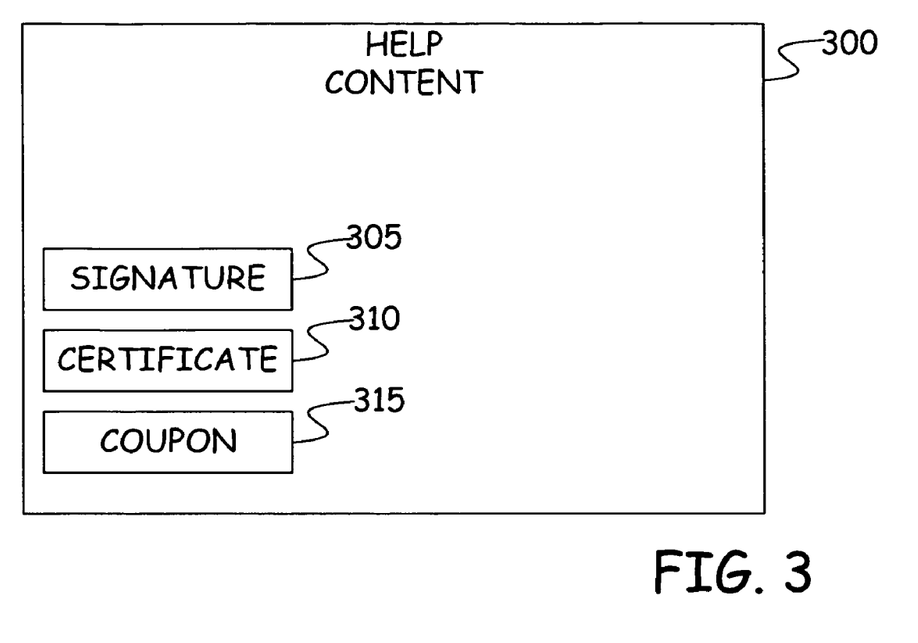
FIG. 3 is a diagrammatic illustration of features of help content in accordance with an example embodiment.

A more detailed discussion of method embodiments is now provided. Security manager 250 is configured, in some embodiments, to execute these methods using trust based security model 260. Referring to FIG. 3, shown is a help content file or files 300 having features which are employed in exemplary embodiments by security manager 250 to implement the trust based security. As illustrated, depending on the particular embodiment, content 300 should include some or all of a digital signature 305, a certificate 310, and a coupon or key 315. While not all embodiments require all three of these to be considered trusted content, a description is provided of an example in which all three of these features are used.

Signature 305 can be any desired electronic signature format which indicates a source of an electronic document or file. For example, signature 305 can be an XML (EXtensible Markup Language) signature in accordance with the W3C standard for digitally signing, and authenticating, XML documents. Other digital signature formats can be used as well. When adding a digital signature 305, a digital certificate 310 can be required as well. Digital certificates, which can be obtained through commercial certification authorities, such as VeriSign, Inc., establish the authenticity of the signature.

Electronic coupon (or key) 315 can also be included in help content 300. Generically, an electronic coupon is a way to securely identify a relationship between two electronic documents. Thus, electronic coupons are used in some embodiments to allow a set of subset of content to plug into another content set. The coupon or key is controlled by the original owner of the parent content set and handed out to designated organizations.

Figure 4:
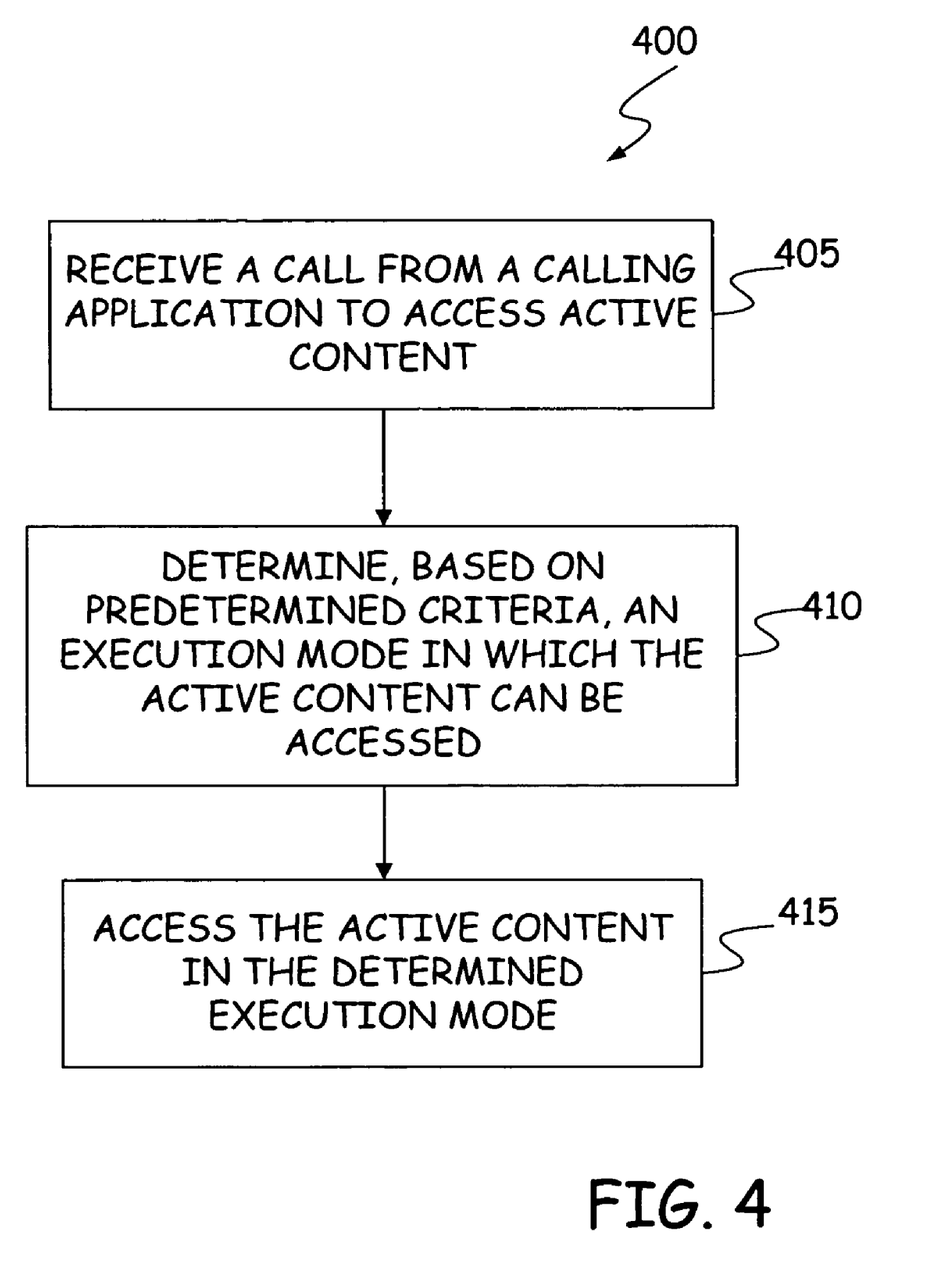
FIG. 4 is a flow diagram illustrating an example method embodiment.

Referring now to FIG. 4, shown is a flow diagram 400 illustrating an embodiment of a method of providing security in a help system. Security manager 250, using trust based security model 260, can be configured to implement a method as shown in FIG. 4. As shown at block 405, the method includes receiving a call from a calling application (i.e., application 207 shown in FIG. 2) to access active content. That active content can be content (such as content 220) which is downloadable from a server computer, or content on the same computer as application 207. After receiving the call from the calling application 207, it is determined (for example by security manager 250), based on predetermined criteria (for example as defined by trust based security model 260) which execution mode can be used to access the active content. This is illustrated in the step shown at block 410 in FIG. 4. Then, as shown at block 415, the method includes the step of accessing the active content in the determined execution mode.

As described above, in some embodiments, the execution modes which can be used to access the active content include a safe mode and a trust mode. Trust mode is the normal execution mode, and in trust mode execution or invocation of code or other active content is allowed and runs with the privileges of the calling application. In safe mode, indicating a lack of trust in either or both of the calling application and the target active content, the content of the active content file is statically rendered or displayed to the extent possible, but execution of code in the active content is limited. For example, in safe mode, there can be a prohibition on the invocation of ACWs and shell execute content. Also, a prohibition on access to online help content can be enforced in this mode. To statically render the active content file, titles, state probes and behaviors can be rendered in a SEE-constrained environment. The term SEE (Secure Execution Environment) refers to a special permission set for restricted managed applications. The term SEE-constrained generally describes a runtime environment (presumably an appdomain) that sandboxes an assembly with SEE permissions. In other words, the help system denies any attempt by the assembly to elevate permissions. It must be noted that, while two execution modes are used in this example embodiment, other numbers of execution modes can be used in other embodiments. Also, instead of using SEE, traditional native code based security can be used for some modes.

The predetermined criteria which control the execution mode in response to a particular call to access active content include, in an example embodiment, the following: (1) the trust status (trusted, untrusted, etc) of the calling application; and (2) whether the requested active content is from a trusted source. The determination as to whether the requested active content is from a trusted source can include several criteria in some embodiments. For example, one criteria is whether the active content is electronically signed (305 in FIG. 3). If it is not electronically signed, then it is determined to not be from a trusted source. Even if the active content is electronically signed, in some embodiments to be a trusted source, the active content must have a valid certificate (310 in FIG. 3). In still other embodiments, it is additionally (or alternatively) necessary that the requested active content have a valid coupon or key (315 in FIG. 3) to be from a trusted source. This is used, in particular, when attempting to plug content ("child content") into other content ("parent content"), as was described above.

Figure 5:
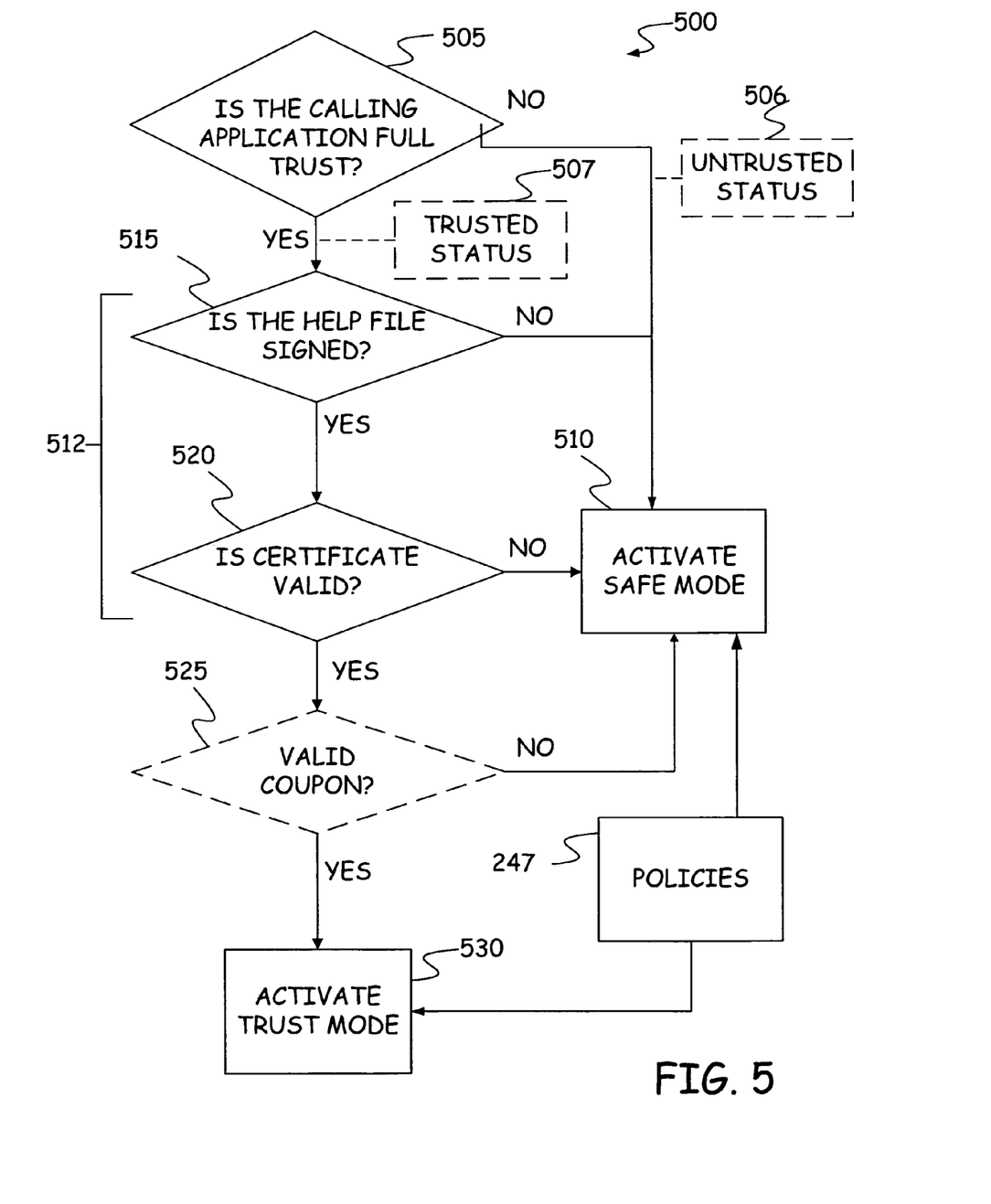
FIG. 5 is a flow diagram illustrating a more detailed example method embodiment.

FIG. 5 is a flow diagram 500 illustrating the different criteria described above in a process of determining which execution mode in which active content can be accessed. At decision 505, it is first determined whether the calling application is a trusted application. If the application status of the calling application is untrusted (untrusted calling application status represented at 506), then the active content is accessed in safe mode (represented at 510). If the trust status of the calling application is trusted (trusted calling application status represented at 507), then the execution mode determination process continues to decision 515 where it is determined whether the active content (e.g., help file) is signed or not. If it is not signed, then the active content is accessed in safe mode 510. If the active content is signed, the process continues to decision 520, where it is determined if the content has a valid certificate. Again, if the content does not have a valid certificate, then the active content is accessed in the safe mode. As described above, decisions 515 and 520 are part of the overall decision 512 as to whether the active content is from a trusted source.

In other optional embodiments as described above, the execution mode determining step or process can further include the decision 525, where it is determined whether the requested content has a valid coupon. If not, the safe mode 510 is again the selected execution mode. If all of these criteria are met, then the active content can be accessed in the trust mode, represented at 530. However, recall that policies 247 can dictate which mode will be used, even if the other decision steps lead to a different conclusion.

Figure 6:
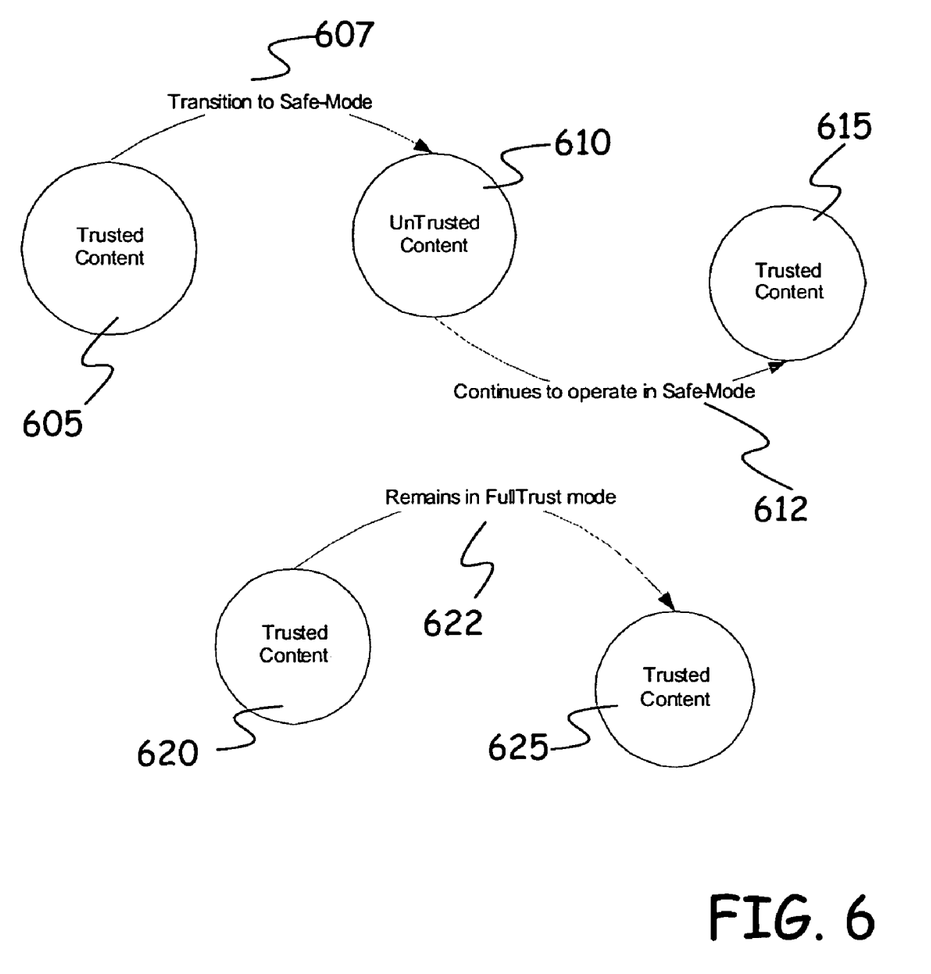
FIG. 6 is a diagrammatic illustration of transitions between trusted and untrusted content.

Referring now to FIG. 6, shown is a diagrammatic representation of transitions between trusted and untrusted content. If an application is accessing trusted active content 605 in the trust mode, an a call is received to access untrusted active content 610, security manager 250 causes a transition to the safe mode as shown at 607. However, in contrast, if a call is received to then access trusted active content 615, security manager 250 continues to operate in the safe mode as shown at 612 in order to prevent an elevation of privileges of untrusted content 610.

If however, security manager 250 is operating in trust mode while accessing trusted content 620, then other trusted content 625 can be accessed without transitioning out of trusted mode into safe mode. This is represented at 622 in FIG. 6. This illustrates that additional trusted content can be accessed while remaining in trust mode, since the first trusted content will not have an elevation of privileges.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of providing security in a help system which teaches users how to accomplish tasks, the method comprising:

receiving a call at the help system implemented using a processor, from a calling application, to access active content;

using the processor to determine, based on predetermined criteria, an execution mode, from at least two execution modes including a trust mode and a safe mode, in which the active content is accessed, wherein determining the execution mode in which the active content is accessed further comprises determining whether to access the active content in the trust mode or in the safe mode, the trust mode allowing execution of code in the active content, and the safe mode statically rendering content of the active content but limiting execution of code in the active content, wherein statically rendering content of the active content comprises prohibiting invocation of shell execute content, prohibiting access to online content, and rendering titles, state probes and behaviors in a secure execution environment (SEE)-constrained environment, and wherein determining the execution mode further comprises determining a trust status of the calling application, wherein the calling application has one of a trusted application status and an untrusted application status, and further comprising using the processor to determine if the active content is electronically signed, and if the active content is electronically signed, using the processor to determine whether the active content has a valid certificate, the active content being determined to be from an untrusted source if the active content does not have a valid certificate;

using the processor to determine, when the call is received at the help system from the calling application, whether other active content is currently being accessed in the trust mode or the safe mode; and using the processor to access the active content called by the calling application in the determined execution mode if the other active content is currently being accessed in the trust mode, and automatically accessing the active content called by the calling application in the safe mode, regardless of whether the determined execution mode is the safe mode or the trust mode, if the other active content is currently being accessed in the safe mode, to prevent an elevation of privileges of untrusted content.

2. The computer-implemented method of claim 1, wherein the execution mode is determined to be the safe mode if the calling application is determined to have the untrusted application status.

3. The computer-implemented method of claim 2, wherein using the processor to determine, based on the predetermined criteria, the execution mode in which the active content is accessed further comprises using the processor to determine whether the active content is from a trusted source, the execution mode in which the active content is accessed being determined to be the safe mode if the active content is not determined to be from a trusted source.

4. The computer-implemented method of claim 1, wherein using the processor to determine, based on the predetermined criteria, the execution mode in which the active content is accessed further comprises using the processor to determine if the active content has a valid coupon, wherein the execution mode is determined to be the safe mode if the active content is determined to not have a valid coupon.

5. The computer-implemented method of claim 1, wherein using the processor to determine, based on the predetermined criteria, the execution mode in which the active content is accessed further comprises using the processor to determine the execution mode in which the active content is accessed based on administrative policies governing operation of a computer on which the calling application resides.

6. The computer-implemented method of claim 5, wherein the method steps are implemented using a trust model, the trust model being dynamic in nature such that if the administrative policies change, the trust model uses the changed policies to enforce execution of the active content.

7. A system for providing help to a user of a computer, the system comprising:
a processor and associated memory storing computer executable instructions for configuring the processor to implement system components comprising:
a help system which teaches users how to accomplish tasks and which receives a call from a calling application to access active content; and
a security manager which uses a trust based security model to determine an execution mode in which the called active content is accessed based on predetermined criteria, and wherein the security manager is configured to determine whether to access the called active content in a trust mode or in a safe mode, the trust mode allowing execution of code in the called active content, and the safe mode statically rendering content of the called active content but limiting execution of code in the called active content, wherein statically rendering content of the called active content comprises prohibiting invocation of shell execute content, prohibiting access to online content, and rendering titles, state probes and behaviors in a secure execution environment (SEE)-constrained environment, wherein the security manager is further configured to determine, when the help system receives the call from the calling application to access the called active content, whether other active content is currently being accessed in the trust mode or the safe mode, the security manager allowing the called active content to be accessed in the execution mode determined based on the predetermined criteria if the other active content is currently being accessed in the trust mode, but the security manager only allowing the called active content to be accessed in the safe mode, regardless of the determination made based on the predetermined criteria, if the other active content is currently being accessed in the safe mode, in order to prevent an elevation of privileges of untrusted content, wherein the predetermined criteria include a trust status of the source of the called active content, the security manager being further configured to determine the trust status of the source of the called active content by determining if the called active content is electronically signed and has a valid certificate, the called active content being determined to be from an untrusted source if the active content is not electronically signed or does not have a valid certificate.

8. The system of claim 7, wherein the predetermined criteria include a trust status of the calling application, wherein the calling application has one of a trusted application status and an untrusted application status, the security manager being further configured to determine the trust status of the calling application.

9. The system of claim 8, wherein the security manager is configured to determine that the execution mode is the safe mode if the calling application is determined to have the untrusted application status.

10. The system of claim 7, wherein the execution mode in which the called active content is accessed is determined to be the safe mode if the called active content is not determined to be from a trusted source.

11. The system of claim 7, wherein the predetermined criteria further include whether the called active content has a valid coupon, wherein the execution mode is determined to be the safe mode if the called active content is determined to not have a valid coupon.

* * * * *